(12) United States Patent
Lynch et al.

(10) Patent No.: US 8,994,311 B1
(45) Date of Patent: Mar. 31, 2015

(54) SYSTEM, METHOD, AND COMPUTER PROGRAM FOR SEGMENTING A CONTENT STREAM

(75) Inventors: James Lynch, Ballycullen (IE); Evelyn Balfe, Dun Laoghaire (IE); Barry J. Smyth, Sandyford (IE); Paul Cotter, Dundrum (IE)

(73) Assignee: Amdocs Software Systems Limited, Dublin (IE)

( * ) Notice: Subject to any disclaimer, the term of this patent is extended or adjusted under 35 U.S.C. 154(b) by 299 days.

(21) Appl. No.: 12/898,641

(22) Filed: Oct. 5, 2010

Related U.S. Application Data

(60) Provisional application No. 61/345,031, filed on May 14, 2010.

(51) Int. Cl.
*G06F 11/34* (2006.01)
*G06F 17/30* (2006.01)

(52) U.S. Cl.
CPC ............... *G06F 17/3089* (2013.01)
USPC ........................................ 318/565

(58) Field of Classification Search
USPC ......... 707/614, 618, 673, 696, 706, 707, 711, 707/715, 722, 723, 733, 734, 741, 749, 753, 707/754, 759–770, 780, 784
See application file for complete search history.

(56) References Cited

U.S. PATENT DOCUMENTS

| | | | |
|---|---|---|---|
| 2002/0198905 A1* | 12/2002 | Tabatabai et al. | 707/501.1 |
| 2004/0064207 A1* | 4/2004 | Zacks et al. | 700/91 |
| 2007/0214097 A1 | 9/2007 | Parsons et al. | |
| 2007/0255702 A1* | 11/2007 | Orme | 707/5 |
| 2007/0279494 A1* | 12/2007 | Aman et al. | 348/169 |
| 2009/0271524 A1 | 10/2009 | Davi et al. | |
| 2010/0023984 A1 | 1/2010 | Davi et al. | |
| 2011/0040760 A1* | 2/2011 | Fleischman et al. | 707/737 |
| 2011/0043652 A1* | 2/2011 | King et al. | 348/222.1 |
| 2011/0173235 A1* | 7/2011 | Aman et al. | 707/792 |

* cited by examiner

*Primary Examiner* — Hosain Alam
*Assistant Examiner* — Reza Hosseini
(74) *Attorney, Agent, or Firm* — Zilka-Kotab, PC

(57) ABSTRACT

A system, method, and computer program product are provided for segmenting a content stream. In use, a content stream associated with an event is identified. Additionally, user generated content associated with the content stream is identified. Further, a timing of one or more key events within the content stream is determined, based on the user generated content. Further still, the one or more key events are identified, based on the user generated content. Also, the content stream is segmented, utilizing the one or more key events and the timing of the one or more key events. In addition, a subset of the user generated content and a subset of the one or more key events is associated with a segment of the content stream. Furthermore, a search index associated with the segment of the content stream is generated, utilizing the subset of the user generated content and the subset of the one or more key events. Further still, a search query is received from a user. Also, search results are provided to the user in response to the search query, utilizing the search index associated with the segment of the content stream.

18 Claims, 9 Drawing Sheets

Safety Alguersuari CAR ALG Button China Jenson
LAP  PVG18  Alonso  BACK  BBC  BBC1  Bernie  Bull

SYSTEM, METHOD, AND COMPUTER PROGRAM FOR SEGMENTING A CONTENT STREAM

CLAIM OF PRIORITY

The present application claims priority to U.S. Provisional Patent Application No. 61/345,031 entitled "SYSTEM, METHOD, AND COMPUTER PROGRAM FOR SEGMENTING A CONTENT STREAM" filed May 14, 2010, which is hereby incorporated by reference.

FIELD OF THE INVENTION

The present invention relates to streaming media, and more particularly to analyzing streaming media.

BACKGROUND

Internet video in all its forms is one of the fastest growing areas of use on the Internet. For example, Internet video is now approximately one third of all consumer Internet traffic, not including the amount of video exchanged through peer-to-peer (P2P) file sharing. In the future, it is predicted that various forms of video (e.g., TV, video on demand (VoD), Internet Video, P2P, etc.) may exceed 90 percent of global consumer traffic.

Finding interesting and relevant media online is a key challenge, especially since traditional text based search strategies may struggle when it comes to video and other media sources. Manual tagging and automatic speech recognition may help to some degree but these tend to be either time consuming or inaccurate.

This difficulty in search is coupled with user's fast reducing attention spans, particularly in the fast moving mobile Internet, which leads to a severe information overload problem.

There is thus a need for addressing these and/or other issues associated with the prior art.

SUMMARY

A system, method, and computer program product are provided for segmenting a content stream. In use, a content stream associated with an event is identified. Additionally, user generated content associated with the content stream is identified. Further, a timing of one or more key events within the content stream is determined, based on the user generated content. Further still, the one or more key events are identified, based on the user generated content. Also, the content stream is segmented, utilizing the one or more key events and the timing of the one or more key events. In addition, a subset of the user generated content and a subset of the one or more key events is associated with a segment of the content stream. Furthermore, a search index associated with the segment of the content stream is generated, utilizing the subset of the user generated content and the subset of the one or more key events. Further still, a search query is received from a user. Also, search results are provided to the user in response to the search query, utilizing the search index associated with the segment of the content stream.

DETAILED DESCRIPTION

Figure 1:
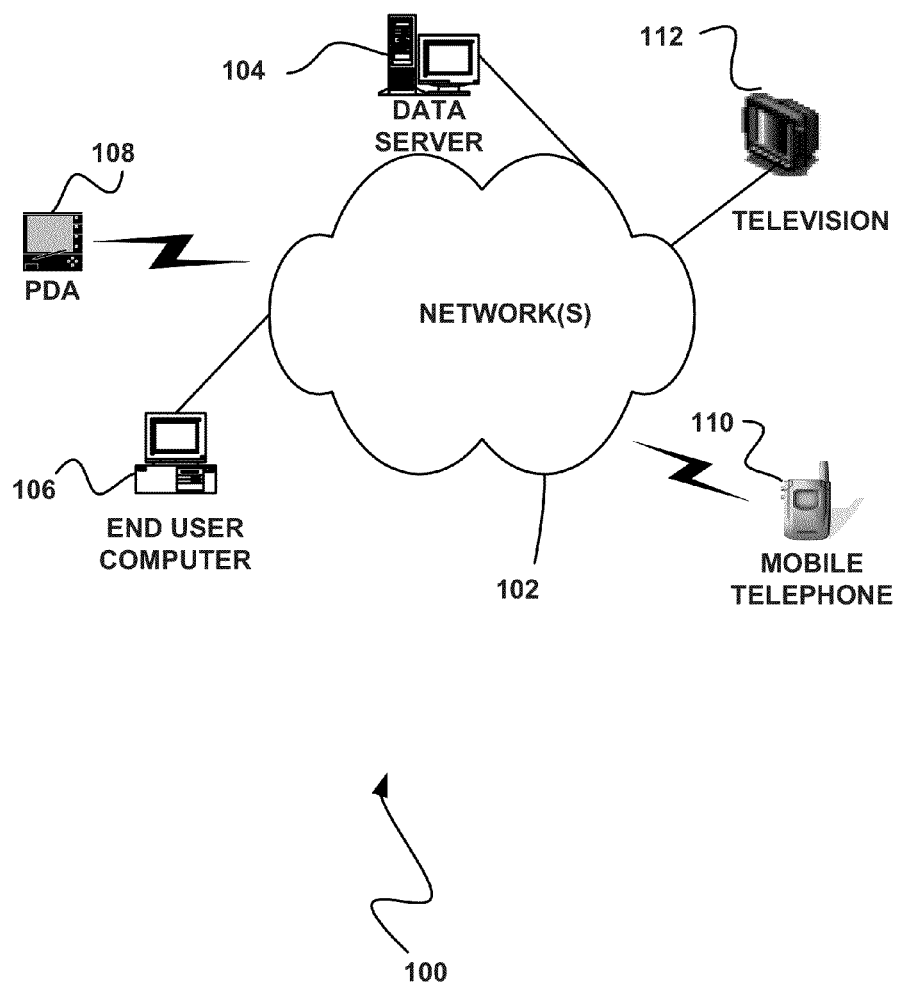
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
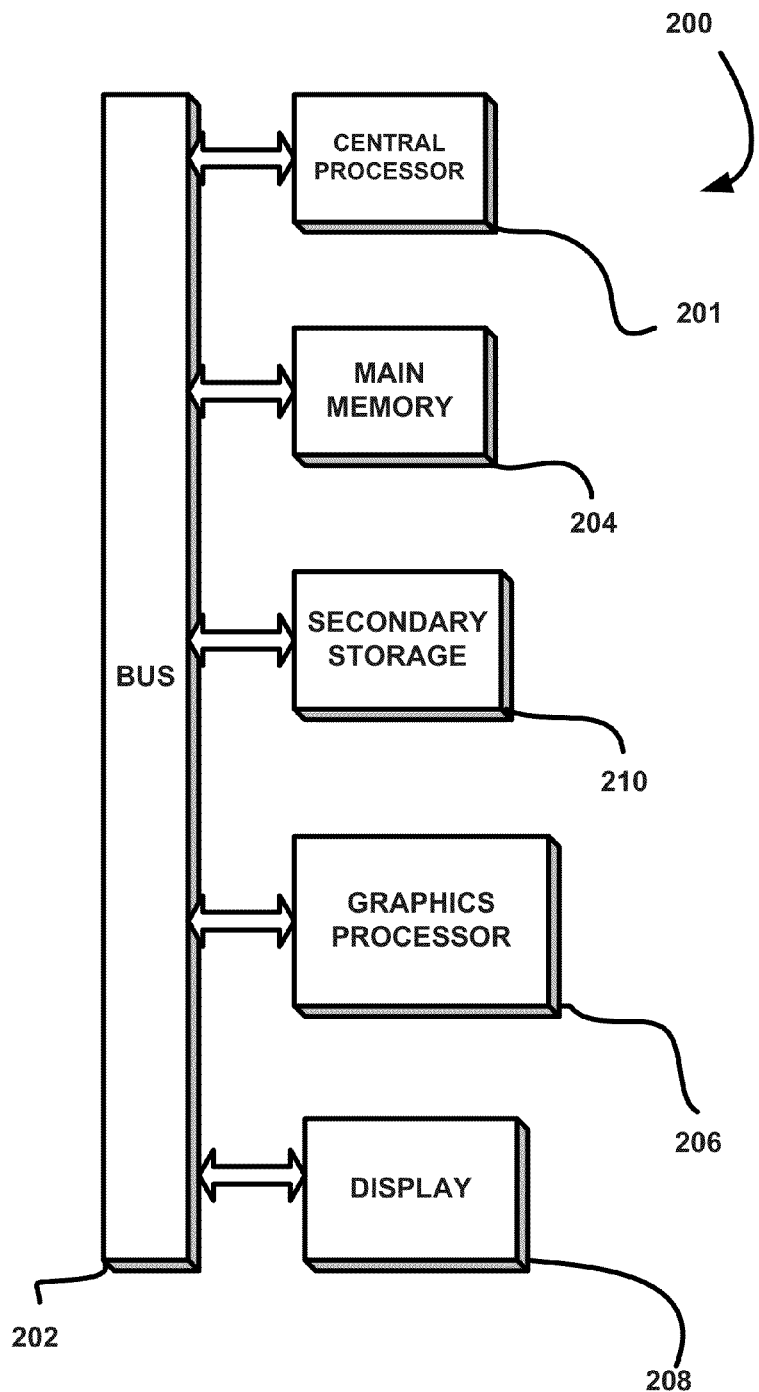
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
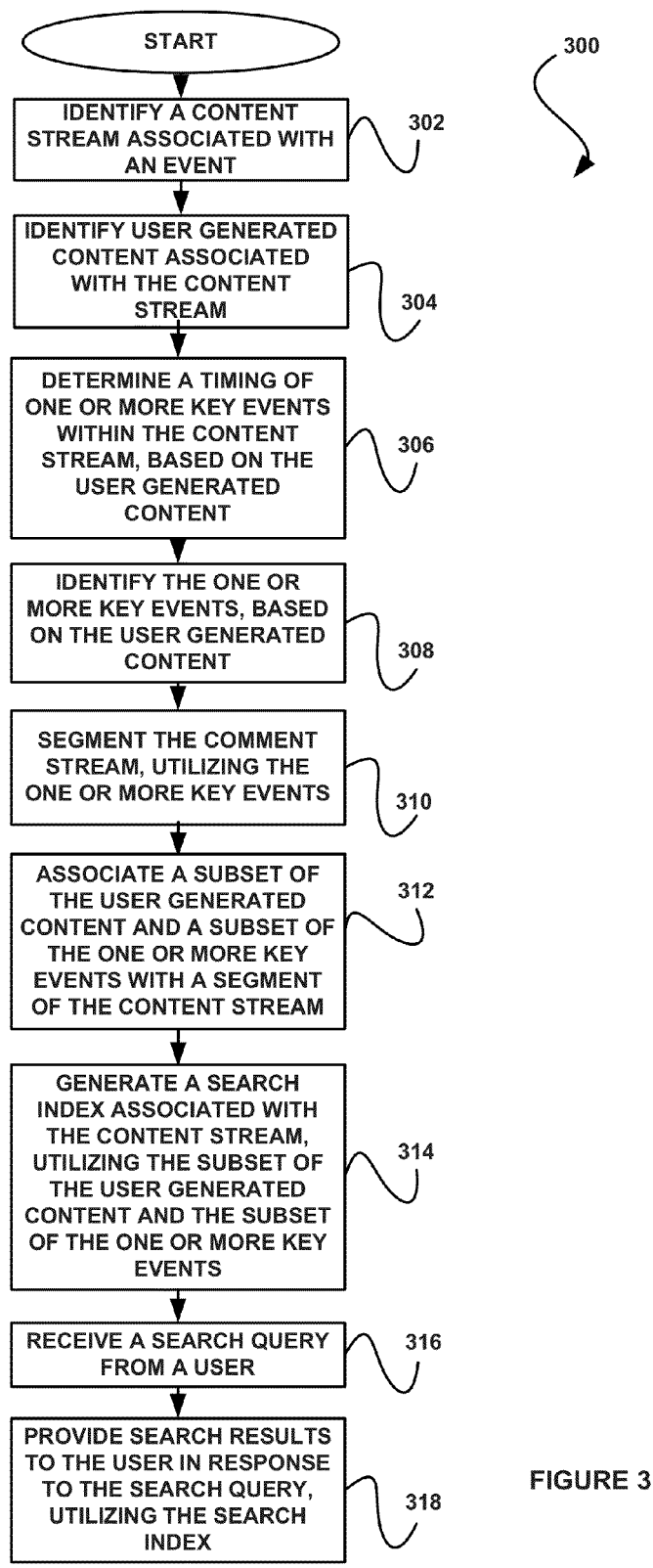
FIG. 3 illustrates a method for segmenting a content stream, in accordance with one embodiment.

FIG. 3 shows a method 300 for segmenting a content stream, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a content stream associated with an event is identified. In one embodiment, the content stream may include any type of streaming content. For example, the content stream may include any form of content media that is streamed, broadcasted, recorded, etc. In another embodiment, the content stream may be located on any type of media. For example, the content stream may be located online, on physical storage, etc. Additionally, the content may include any type of content that is capable of being streamed. For example, the content may include one or more of video content, audio content, text content, etc.

Further, the event may include any type of occurrence that may be captured in a content stream. For example, the event may include a television show, a sporting event, a conference, a political debate, etc. More specifically, the content stream may include a stream of such event. Further still, in one embodiment, the content stream may be identified by receiving the content stream. For example, the content stream may be downloaded, monitored, intercepted, etc.

Additionally, as shown in operation 304, user generated content associated with the content stream is identified. In one embodiment, the user generated content may include any content generated by one or more users that is associated with the content stream. For example, the user generated content may include a web log (blog) entry about the content stream, a tweet about the content stream, a short message service (SMS) message about the content stream, a phone call about the content stream, social commentary about the content stream, etc. In one embodiment, the user generated content may be directly associated with the content stream. For example, the user generated content may directly address one or more elements of the content stream. In another embodiment, the user generated content may be indirectly associated with the content stream. For example, the user generated content may include one or more keywords associated with the content stream, etc. Of course, however, the user generated content may be associated with the content stream in any manner.

In another embodiment, the user generated content may include automatically generated content. For example, the user generated content may include an automated update, a preprogrammed response, an artificially produced update, etc. Additionally, in one embodiment, the user generated content associated with the content stream may be identified by receiving the user generated content. For example, the user generated content may be downloaded, monitored, intercepted, etc.

Further, a timing of one or more key events within the content stream is determined, based on the user generated content. See operation 306. In one embodiment, the key events may include one or more points in the content stream that are determined to be significant. For example, the key events may include one or more points in the content stream that caught user interest more than others (e.g., a crash or overtaking move in an automobile race, a controversial comment during a political debate, etc.).

In another embodiment, determining the timing of the one or more key events may include synchronizing the content stream with the user generated content. For example, the content stream and user generated content may be synchronized with respect to time. Additionally, the timing of the one or more key events may be determined by monitoring a volume of the user generated content. For example, a key event may be determined within the content stream if a particular volume of user generated content associated with the content stream is identified within a predetermined amount of time. In another example, a traffic analyzer may be used to determine the volume of the user generated content.

Further still, as shown in operation 308, the one or more key events are identified based on the user generated content. In one embodiment, one or more descriptions within the user generated content may be identified (e.g., using one or more machine learning algorithms, etc.). For example, one or more keywords, tags, topics, or other descriptive data within the user generated content may be identified. Further, the one or more descriptions may be correlated with the one or more key events. For example, a key event may be correlated, labeled, etc. with a description within the user generated content, based on the time of the key event and the time the description was generated.

Also, as shown in operation 310, the content stream is segmented, utilizing the one or more key events and the timing of the one or more key events. In one embodiment, the segmenting may include marking the one or more key events within the content stream based on the timing of the one or more key events. For example, the one or more key events may be marked on an illustration representing the content stream. In another embodiment, the segmenting may include labeling the key events within the content stream. For example, each of the one or more key events marked within the content stream may be labeled based on the identification of the particular key event. In yet another embodiment, the segmenting may include dividing the content stream into one or more portions, based on the timing of the one or more key events. For example, the content stream may be divided into multiple portions, where each portion contains one or more key events.

In this way, key events in the content stream associated with the event may be identified by looking at an amount of user generated content being written about the event and by analyzing the content itself.

Further, as shown in operation 312, a subset of the user generated content and a subset of the one or more key events is associated with a segment of the content stream. For example, one or more elements of the user generated content that were generated during the same time the segment of the content stream was shown may be associated with the segment of the content stream. In another example, the subset of the one or more key events having a timing that occurs during the same time the segment of the content stream was shown may be associated with the segment of the content stream.

In one embodiment, the subset of the user generated content and the subset of the one or more key events may be associated with the segment of the content stream by linking the subset of the user generated content and the subset of the one or more key events with the segment of the content stream. For example, the subset of the user generated content and the subset of the one or more key events may be linked with the segment of the content stream in a database or other data store. Of course, however, the subset of the user generated content and the subset of the one or more key events may be associated with the segment of the content stream in any manner.

Further still, as shown in operation 314, a search index associated with the segment of the content stream is generated, utilizing the subset of the user generated content and the subset of the one or more key events. For example, the subset of the user generated content and the subset of the one or more key events may be included in the search index. In the context of the present embodiment, the search index may include any index that is used in association with a search. For example, the search index may be used to conduct a search of the subset of the user generated content and the subset of the one or more key events. In another example, the search index may be used to conduct a search of one or more segments of one or more content streams. In another embodiment, the search index may be used in association with a local network search, an Internet search, a database search, or any other type of search. In yet another embodiment, the search index may be stored on a database, a distributed system, or any other storage medium.

Also, as shown in operation 316, a search query is received from a user. In one embodiment, the search query may be alphanumeric, may include a string, may include one or more operators (AND, OR, XOR, etc.), etc. Of course, however, the search query may include any query to be used in the performance of a search. Additionally, in another embodiment, the search query may be received utilizing a graphical user interface (GUI). For example, the user may input the search query into a search form that is part of the GUI.

Furthermore, as shown in operation 318, search results are provided to the user in response to the search query, utilizing the search index associated with the segment of the content stream. In one embodiment, the search query may be compared against the search index associated with the segment of the content stream as well as against additional search indexes associated with additional segments of the content stream, segments of other content streams, or any other search indexes.

In one embodiment, the search results may include the segment of the content stream. For example, the search query may be compared against the search index, and if a match is found based on the comparison, the segment of the content stream may be output to the user. In yet another embodiment, the search results may include a link to the segment of the content stream. In still another embodiment, the search results may include one or more words associated with the subset of the user generated content and the subset of the one or more key events.

Also, in one embodiment, the search results may be tailored according to one or more criteria. For example, the search results may be ordered, ranked, etc. based on a popularity of each of the search results. In another embodiment, the search results may be tailored according to one or more elements associated with the user. For example, the search results may be ordered, ranked, etc. based on past user searches. In another example, the search results may be ordered, ranked, etc. based on one or more portions of the user generated content associated with the user. For example, the search results may be ranked based on one or more portions of the user generated content drafted by the user. In this way, the search results may be personalized with respect to the user, resulting in user search results that are more relevant to the user. Also, in another embodiment, a personal summary of the one or more key events may be provided to the user, based on one or more criteria. For example, the personal summary of the one or more key events may be provided to the user, based on a profile of the user.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
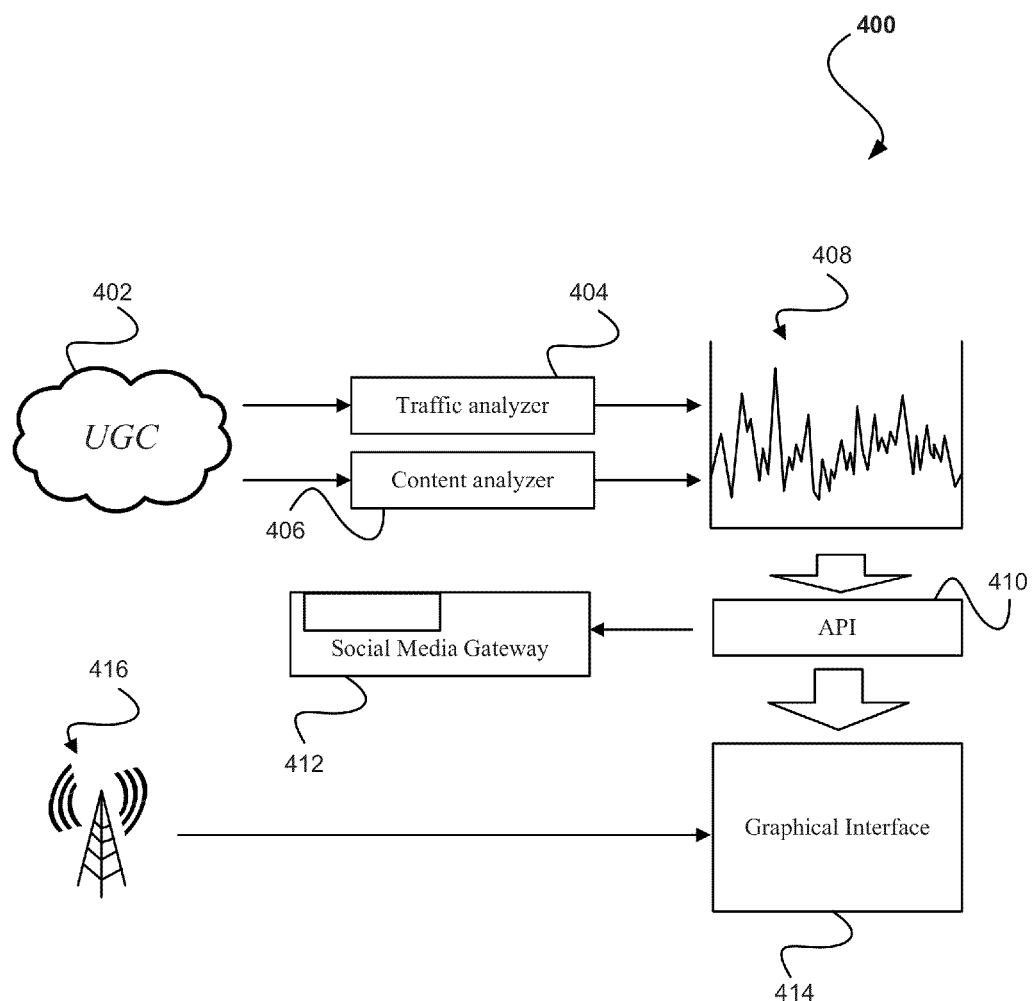
FIG. 4 illustrates an exemplary system architecture for segmenting a content stream, in accordance with one embodiment.

FIG. 4 shows an exemplary system architecture 400 for segmenting a content stream, in accordance with one embodiment. As an option, the system architecture 400 may be implemented in the context of the details of FIGS. 1-3. Of course, however, the system architecture 400 may be carried out in any desired environment. Further, the aforementioned definitions may equally apply to the description below.

As shown, the system architecture 400 includes a user generated content source 402. In one embodiment, the user generated content source 402 may include any source of user generated content. For example, the user generated content source 402 may include live user generated content, previously generated user content, etc. In another example, the user generated content source may include a user generated content stream. In another embodiment, the content of the user generated content source 402 may be chronologically ordered. In yet another embodiment, the content of the user generated content source 402 may be selected manually and/or automatically. Of course, however, the content of the user generated content source 402 may be selected in any manner.

Additionally, the system architecture 400 includes a traffic analyzer 404. In one embodiment, the traffic analyzer 404 may be used to determine a timing of key events from within the user generated content source 402. For example, the traffic analyzer 404 may analyze a level of traffic (e.g., a frequency of adding comments, etc.) of the user generated content. This analysis may be performed using methods such as traffic level analyses, a CW Buzz detection algorithm, machine learning techniques, etc. Additionally, particular levels of traffic may be identified by the traffic analyzer 404 as being associated with key events.

Figure 5:
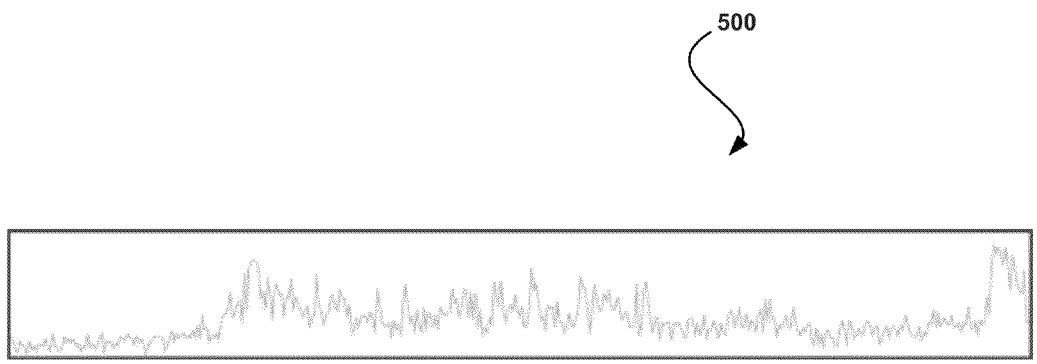
FIG. 5 illustrates an exemplary visual representation of a volume of a user generated content stream, in accordance with one embodiment.

Further, the system architecture 400 includes a visual representation 408 of a user generated content stream illustrating key events. Another exemplary visual representation 500 of a volume of a user generated content stream is shown in FIG. 5, in accordance with one embodiment. In yet another embodiment, the traffic analyzer 404 may determine a timing of key events within the user generated content source by analyzing one or more topics from within the user generated content source. Additionally, in another embodiment, one or more machine learning algorithms may be used in determining the timing of key events within the user generated content source.

Figure 6:
FIG. 6 illustrates an exemplary representation of a tag cloud, in accordance with one embodiment.

Further, the system architecture 400 includes a content analyzer 406. In one embodiment, the content analyzer 406 may identify the one or more key events of the user generated content source 402. In another embodiment, the content analyzer 406 may extract from the user generated content information that correlates to the key points in the user generated content. For example, the content analyzer 406 may extract from the user generated content one or more keywords, tags, etc. that correlate to the key points in the user generated content. In one embodiment, the keywords may have a form of a tag cloud. One exemplary representation of a tag cloud 600 is shown in FIG. 6, in accordance with one embodiment.

In yet another embodiment, personalized key events may be identified within the user generated content. For example, the content analyzer 406 may identify personalized key events within the user generated content that appeal to a particular user or community of users, such as events related to a particular athlete that has a particular following. In another embodiment, the personalized key events may be identified despite the fact that they are not as popular as other events and are overshadowed by those events in the user generated content.

Figure 7:
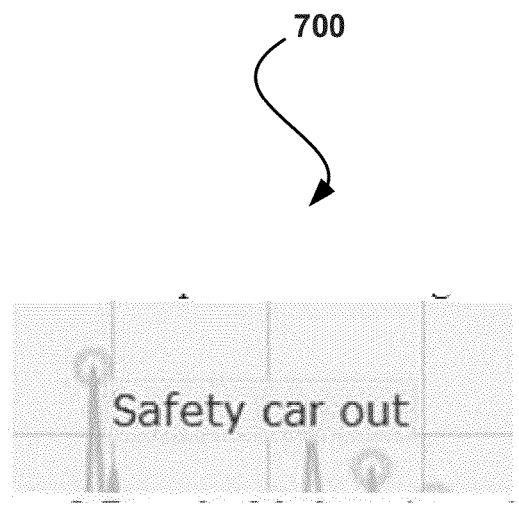
FIG. 7 illustrates an exemplary representation of an identified key event, in accordance with one embodiment.

In another embodiment, the content analyzer 406 may identify individual user generated comments that most accurately reflect the key events within the content stream. For example, the content analyzer 406 may perform such identification utilizing data mining or an equivalent machine learning technique. One exemplary representation of an identified key event 700 is shown in FIG. 7, in accordance with one embodiment.

Further still, the system architecture 400 includes an application programming interface (API) 410, which is exposed to a third party destination 412 and a graphical interface 414. In one embodiment, the API 410 may feed information to the third party destination 412 and/or the graphical interface 414.

In this way, the system architecture 400 may provide user generated content and/or social commentary associated with key events of the content stream (e.g., to the third party destination 412, the graphical interface 414, etc.). Additionally, the system architecture 400 may provide an overall summary of the event (e.g., to the third party destination 412, the graphical interface 414, etc.). Further, in one embodiment, the system architecture 400 may provide a characterization about the event. For example, such characterization may be chronological (e.g., events during the course of a sports event), non-chronological (top ten key events), etc.

In another embodiment, personalized summaries of the key events may be provided to one or more users by the system architecture 400. For example, the system architecture 400 may use the key events and their corresponding identifications to provide personalized summaries to one or more users of the system architecture 400. In one embodiment, the personalized summaries may be based on the content of the social commentaries, one or more user profiles, etc. For example, a user profile may be created based on but not limited to the user's own social commentary, their current search query, a recorded viewing or browsing behavior, one or more profiles of similar users, etc. In another embodiment, the personalized summaries may be based on elements from multiple content streams. For example, a personalized summary may be based on key events from multiple user generated content streams.

In another embodiment, the system architecture 400 may be used to generate one or more search indexes for the content stream based on one or more elements. For example, the system architecture 400 may be used to generate one or more search indexes for the content stream based on key events that are identified. In this way, such indexes could be used to power large scale media search engines, etc.

Further, the system architecture 400 includes a media source 416. In one embodiment, the media source 416 may be used to determine relevant content in the content stream. For example, the system architecture 400 may pair a timing of one or more key events in the content stream with the broadcast time of an event provided by the media source 416 in order to determine relevant content in the content stream.

Further still, in one embodiment, the system architecture 400 may provide identified key events as a navigation aid, bookmarks, etc. to a user browsing through the content feed looking for interesting events (e.g., via the graphical interface 414, etc.). Additionally, in another embodiment, the system architecture 400 may provide the identified key events as feedback (e.g., to support content editing, etc.).

Also, in yet another embodiment, the identified key events and segmentation may be provided (e.g., via the API 410, etc.) for application development. In another embodiment, the system architecture 400 may use identified key events in order to share relevant events with other users or pluralities of users. Additionally, in one embodiment, the system architecture 400 may provide personalized advertising based on one or more interests of the user or the plurality of users, the identified key events, etc. In yet another embodiment, the system architecture 400 may provide automatic commentary of a content stream by using identified key events (including key terms, etc.) to determine relevant social comments for each segment associated with the content stream. These relevant social comments may then be used as a commentary for the stream, as part of an automated commentary stream, etc.

Figure 8:
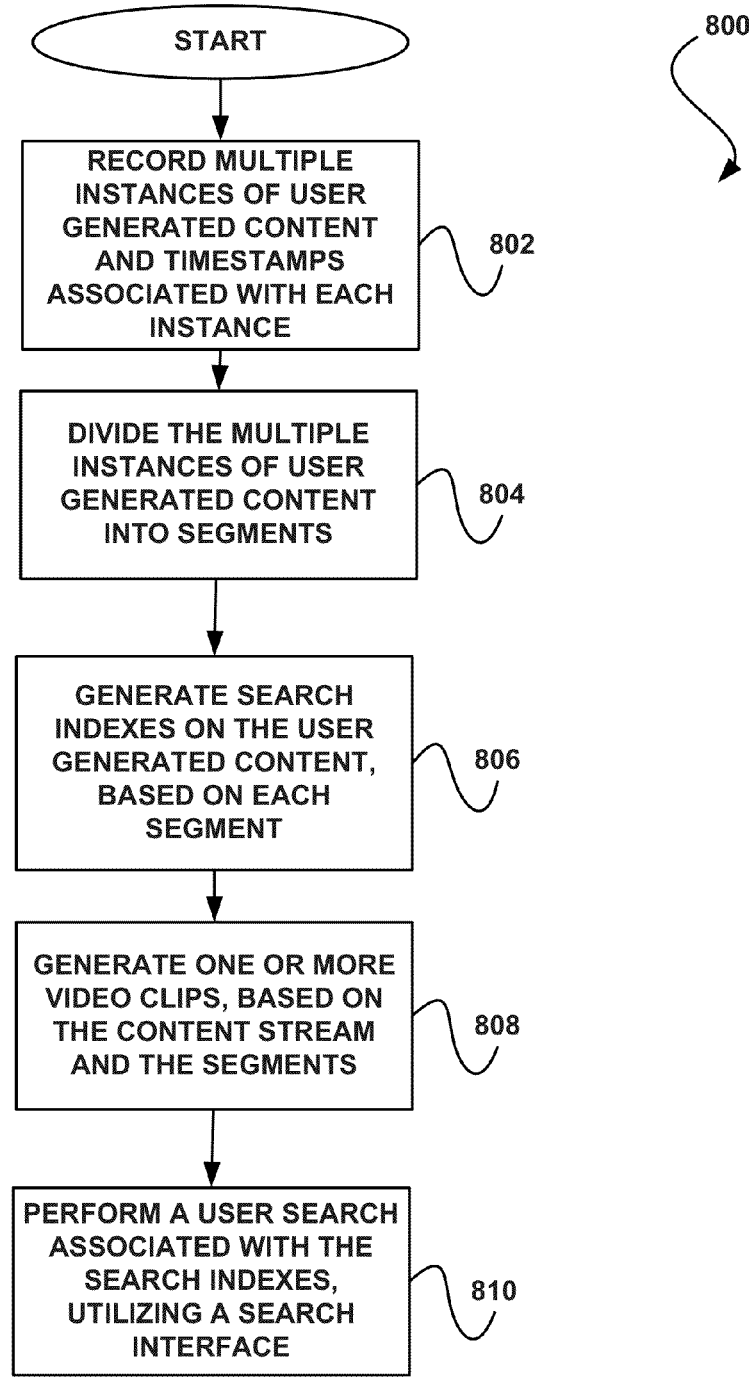
FIG. 8 illustrates a method for provisioning search results for a segmented content stream, in accordance with one embodiment.

FIG. 8 shows a method 800 for provisioning search results for a segmented content stream, in accordance with one embodiment. As an option, the method 800 may be carried out in the context of the details of FIGS. 1-7. Of course, however, the method 800 may be carried out in any desired environment. Further, the aforementioned definitions may equally apply to the description below.

As shown in operation 802, multiple instances of user generated content associated with a content stream are recorded, as well as timestamps associated with each instance of the user generated content. In one embodiment, each timestamp may indicate a time associated with the user generated content. For example, each timestamp may indicate a time at which the instance of user generated content was created, posted, sent, etc.

Additionally, in another embodiment, the multiple instances of user generated content may be recorded in the same location as the timestamps. For example, the multiple instances of user generated content and the timestamps may both be saved to a single database. In another embodiment, the multiple instances of user generated content may be recorded in a different location as the timestamps (e.g., different databases, etc.). In still another embodiment, the recorded timestamps may be associated with the recorded multiple instances of user generated content. For example, each of the recorded multiple instances of user generated content may be linked to its particular timestamp.

Further, as shown in operation 804, the multiple instances of user generated content are divided into segments. In one embodiment, the multiple instances of user generated content may each be associated with a time segment. For example, one or more intervals of time may be determined (e.g., based on a time of an event, a portion of an event, etc.), and each instance of user generated content may be associated with a particular time interval. In another example, each instance of user generated content may be associated with a particular time interval based on the timestamp associated with the instance of user generated content. For instance, one or more instances of user generated content that are associated with timestamps indicating a time falling within a particular time interval may be associated with that particular time interval. In this way, each instance of user generated content may be associated with the time segment in which the instance of user generated content occurred.

In another embodiment, the segments may be determined statically. For example, an event may be divided into present segment intervals (e.g.; by time, etc.). In another example, a time duration during which user generated content was recorded may be divided into present segment intervals. In yet another embodiment, the segments may be determined dynamically. For example, the segments may be determined in real time (e.g., during an event, the recording of user generated content, etc.). In another example, the segments may be determined using one or more configurable intervals.

Further still, as shown in operation 806, search indexes are generated on the user generated content, based on each segment. In one embodiment, the search indexes may be generated based on the text of the user generated content. In another embodiment, one or more key terms may be identified for each segment based on the text of each instance of user generated content associated with that segment. For example, a term frequency score may be determined for each term that occurs within a particular segment. Additionally, a term importance may be determined based on a relative frequency of each term occurring within a particular segment when compared to one or more additional segments. In this way, one or more terms occurring within a particular segment of an event may be determined to be key terms for that segment (e.g., if those one or more terms occur more frequently in that segment than when compared to other segments, etc.). In another embodiment, the one or more key terms associated with each segment may be included in the search index for that segment.

For instance, during an event such as a football match, if a team in the match scores a goal during a particular segment, the term frequency of the term "goal" for that segment may be extremely high. Additionally, the term "goal" may not occur as frequently in other segments of the event during which no goals were scored. Therefore, the relative frequency of the term "goal" may be high during the segment where the goal is scored, and such term may therefore be identified as a key term for that segment and may be included in a search index associated with that segment. In this way, when a user searches for the term "goal," the segment of the event during which the goal was scored may rank near the top of a search results list.

In addition, as shown in operation 808, one or more video clips are generated, based on the content stream and the segments. For example, the one or more video clips may include one or more portions of the content stream. In one embodiment, each video clip may correspond to a segment of user generated content. For example, a start and end time of a generated video clip may correspond to the start and end time of a time segment. In another embodiment, the start and end time of the video clip may be based on a predetermined clip length value.

In still another embodiment, the start and end time of the video clip may be calculated using a clip length offset. Such offset may be dynamic, predetermined, etc. For example, a delay of five to twenty seconds may be subtracted from the start and end time of a time segment in order to determine the start and end time of the video clip associated with that time segment. In this way, the start and end time of a video clip may compensate for a delay between an occurrence of a happening within the content stream and the publishing of user generated content associated with that happening, thereby keeping the video clip in sync with the user generated content.

Also, each of the one or more video clips may be associated with a segment of user generated content. For example, a video clip corresponding to a segment of user generated content may be associated with such segment (e.g., by a link, through a database, etc.). In this way, the one or more key terms identified for a particular segment may be associated with the video clip that is associated with that segment.

Furthermore, as shown in operation 810, a user search associated with the search indexes is performed, utilizing a search interface. In one embodiment, a user may submit a search query as part of an Internet based search, a search of an event database, or any other type of search, utilizing the search interface. In another embodiment, the search indexes generated on the user generated content may be included within such search. For example, the search query may be compared against the search indexes as part of the search process. In another example, the search indexes may be included within a larger search index (e.g., an Internet search engine index, a corporate index, etc.).

Additionally, in another embodiment, in response to the user search, one or more search results may be provided to the user via the search interface, based on the search indexes. For example, the results may include one or more segments of the user generated content that include a key term matching one or more user search terms. In another embodiment, the results may include a link to a segment of the user generated content. Additionally, in one embodiment, the results may include a video clip associated with a segment of the user generated content that includes a key term matching one or more user search terms.

In yet another embodiment, the results may include one or more of a link to the video clip, a relevant frame image associated with the video clip, one or more key term associated with the video clip, one or more instances of social commentary associated with the video clip, etc. In one embodiment, a video clip associated with a particular segment may be dynamically generated in response to a search result containing that segment. In another embodiment, the video clip associated with a particular segment may be previously generated and stored, and may be retrieved in response to a search result containing that segment.

Additionally, in one embodiment, the search results may be ranked. For example, the search results may be ranked based on popularity, time, etc. Further, in another embodiment, search indexes associated with multiple different events may be included in the search. In this way, the search may not be limited to a single event, and it may be possible to perform a simultaneous search of multiple events (e.g., television shows, channels, networks, etc.).

Figure 9:
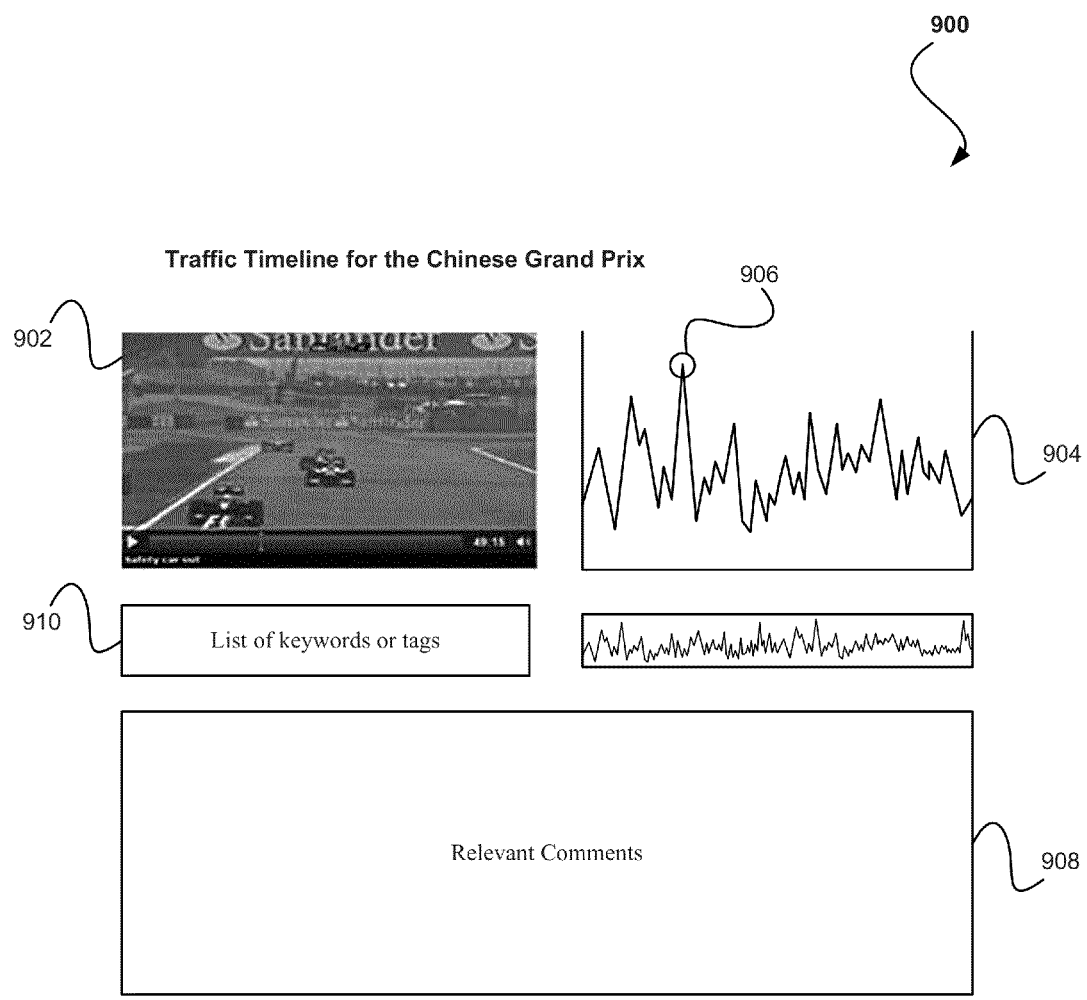
FIG. 9 illustrates an exemplary system interface, in accordance with one embodiment.

FIG. 9 shows an exemplary system interface 900, in accordance with one embodiment. As an option, the system interface 900 may be implemented in the context of the details of FIGS. 1-8. Of course, however, the system interface 900 may be carried out in any desired environment. Further, the aforementioned definitions may equally apply to the description below.

As shown, the system interface 900 includes a video feed 902 and social commentary traffic 904. In one embodiment, the video feed 902 may be synchronized with the social commentary traffic 904. As shown, peaks in the social commentary traffic 904 illustrate events of high interest (e.g., events that are being commented on by many users, etc.). In another embodiment, when a user selects a peak 906 in the social commentary traffic 904, the video feed 902 may show the relevant piece of footage from the content stream.

Additionally, the system interface 900 includes relevant comments 908. In one embodiment, the relevant comments may be associated with the selected peak 906 in the social commentary traffic 904, the relevant footage displayed in the video feed 902, etc. Additionally, the system interface 900 includes a list 910 of keywords or tags correlating with the key events in the content stream. In this way, the system interface 900 may synchronize the video feed 902 and the social commentary traffic 904 in order to identify key segments within the race.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for identifying a content stream associated with an event, wherein the content stream includes one or more of video and audio that is streamed to a user;
    computer code for identifying a plurality of instances of user generated content separate from and associated with the content stream, wherein the plurality of instances of user generated content include a plurality of instances of textual commentary about the content stream that are published via social media synchronously with at least one of the event and the streaming of the content to the user and include one or more of a web log entry about the content stream, a tweet about the content stream, a short message service (SMS) message about the content stream, a phone call about the content stream, social commentary about the content stream, and automatically generated content;

computer code for determining a timing of a plurality of key events within the content stream, based on the plurality of instances of user generated content, where the timing of each of the plurality of key events includes a time of occurrence of each of the plurality of key events and is determined by:

synchronizing the content stream with the plurality of instances of user generated content with respect to time, calculating a number of the plurality of instances of the user generated content that fall within the predetermined timing, and identifying the predetermined timing as the timing of the key event when the number of the plurality of instances of the user generated content calculated for the timing meets a predetermined number;

computer code for identifying the plurality of key events within the content stream, including for each of the plurality of key events:

identifying a plurality of descriptions within the user generated content, identifying a timing when each of the plurality of descriptions within the user generated content was generated, correlating the timing of one or more of the plurality of descriptions with the determined timing of the key event, and labeling the key event with the one or more of the plurality of descriptions correlating with the key event;

computer code for segmenting the content stream into a plurality of segments, such that each segment contains one or more of the identified plurality of key events;

computer code for, for each segment of the content stream:

associating a subset of the user generated content and a subset of the plurality of key events with the segment of the content stream, and generating a search index associated with the segment of the content stream, utilizing the associated subset of the user generated content and the associated subset of the plurality of key events;

computer code for receiving a search query from another user;

computer code for searching a plurality of search indexes including the plurality of generated search indexes based on the search query, by comparing the search query to the plurality of search indexes; and computer code for providing search results to the other user based on the searching;

wherein the computer program is operable such that when the search query matches at least a portion of a particular one of the plurality of generated search indexes associated with a particular one of the segments of the content stream, the search results include the particular one of the segments of the content stream.

2. The computer program of claim 1, wherein the content includes one or more of video content, audio content, and text content.

3. The computer program of claim 1, wherein the computer program is operable such that the user generated content directly or indirectly addresses one or more elements of the content stream.

4. The computer program of claim 1, wherein the plurality of key events include a plurality of points in the content stream that are determined to be significant.

5. The computer program of claim 1, wherein the computer program is operable such that a traffic analyzer is used to determine the frequency of publication of new instances of the user generated content.

6. The computer program of claim 1, wherein the computer code for identifying the plurality of key events further comprises computer code for identifying the descriptions within the user generated content, using one or more machine learning algorithms.

7. The computer program of claim 1, wherein the descriptions include one or more keywords, tags, or topics.

8. The computer program of claim 1, wherein segmenting the content stream includes marking the plurality of key events within the content stream.

9. The computer program of claim 1, wherein the computer program is operable such that the search results are tailored according to one or more elements associated with the other user.

10. The computer program of claim 1, wherein the computer program is operable such that the search results are ranked based on one or more portions of the user generated content being associated with the other user.

11. The computer program of claim 1, further comprising computer code for providing a personal summary of the plurality of key events to the other user, based on a profile of the other user.

12. A method, comprising:

identifying a content stream associated with an event, wherein the content stream includes one or more of video and audio that is streamed to a user;

identifying a plurality of instances of user generated content separate from and associated with the content stream, wherein the plurality of instances of user generated content include a plurality of instances of textual commentary about the content stream that are published via social media synchronously with at least one of the event and the streaming of the content to the user and include one or more of a web log entry about the content stream, a tweet about the content stream, a short message service (SMS) message about the content stream, a phone call about the content stream, social commentary about the content stream, and automatically generated content;

determining a timing of a plurality of key events within the content stream, based on the plurality of instances of user generated content, where the timing of each of the plurality of key events is determined by:

synchronizing the content stream with the plurality of instances of user generated content with respect to time, calculating a number of the plurality of instances of the user generated content that fall within the predetermined timing, and identifying the predetermined timing as the timing of the key event when the number of the plurality of instances of the user generated content calculated for the timing meets a predetermined number;

identifying the plurality of key events within the content stream, including for each of the plurality of key events:

identifying a plurality of descriptions within the user generated content, identifying a timing when each of the plurality of descriptions within the user generated content was generated, correlating the timing of one or more of the plurality of descriptions with the determined timing of the key event, and labeling the key event with the one or more of the plurality of descriptions correlating with the key event;

segmenting the content stream into a plurality of segments, such that each segment contains one or more of the identified plurality of key events;

for each segment of the content stream:

associating a subset of the user generated content and a subset of the plurality of key events with the segment of the content stream, and generating a search index associated with the segment of the content stream, utilizing the associated subset of the user generated content and the associated subset of the plurality of key events;

receiving a search query from another user;

searching a plurality of search indexes including the plurality of generated search indexes based on the search query, by comparing the search query to the plurality of search indexes; and providing search results to the other user based on the searching;

wherein when the search query matches at least a portion of a particular one of the plurality of generated search indexes associated with a particular one of the segments of the content stream, the search results include the particular one of the segments of the content stream.

13. A system, comprising:

a processor for:

identifying a content stream associated with an event, wherein the content stream includes one or more of video and audio that is streamed to a user;

identifying a plurality of instances of user generated content separate from and associated with the content stream, wherein the plurality of instances of user generated content include a plurality of instances of textual commentary about the content stream that are published via social media synchronously with at least one of the event and the streaming of the content to the user and include one or more of a web log entry about the content stream, a tweet about the content stream, a short message service (SMS) message about the content stream, a phone call about the content stream, social commentary about the content stream, and automatically generated content;

determining a timing of a plurality of key events within the content stream, based on the plurality of instances of user generated content, where the timing of each of the plurality of key events is determined by:

synchronizing the content stream with the plurality of instances of user generated content with respect to time, calculating a number of the plurality of instances of the user generated content that fall within the predetermined timing, and identifying the predetermined timing as the timing of the key event when the number of the plurality of instances of the user generated content calculated for the timing meets a predetermined number;

identifying the plurality of key events within the content stream, including for each of the plurality of key events:

identifying a plurality of descriptions within the user generated content, identifying a timing when each of the plurality of descriptions within the user generated content was generated, correlating the timing of one or more of the plurality of descriptions with the determined timing of the key event, and labeling the key event with the one or more of the plurality of descriptions correlating with the key event;

segmenting the content stream into a plurality of segments, such that each segment contains one or more of the identified plurality of key events;

for each segment of the content stream:

associating a subset of the user generated content and a subset of the plurality of key events with the segment of the content stream, and generating a search index associated with the segment of the content stream, utilizing the associated subset of the user generated content and the associated subset of the plurality of key events;

receiving a search query from another user;

searching a plurality of search indexes including the plurality of generated search indexes based on the search query, by comparing the search query to the plurality of search indexes; and providing search results to the other user based on the searching;

wherein when the search query matches at least a portion of a particular one of the plurality of generated search indexes associated with a particular one of the segments of the content stream, the search results include the particular one of the segments of the content stream.

14. The system of claim 13, wherein the processor is coupled to memory via a bus.

15. The method of claim 12, further including providing, to a third party, a chronological characterization of the plurality of key events based on the user generated content.

16. The method of claim 12, wherein the timestamp associated with the subset of the user generated content indicates one of a time at which the subset of the user generated content was created, posted, and sent.

17. The computer program of claim 1, wherein the computer code for associating the subset of the user generated content and the subset of the plurality of key events with the segment of the content stream includes computer code for associating the segment of the content stream with the subset of the user generated content that was generated during a time the segment of the content stream was shown and the subset of the plurality of key events where the timing of each of the key events in the subset occurs during the time the segment of the content stream was shown.

18. The computer program of claim 1, wherein the computer code for generating the search index associated with the segment of the content stream, utilizing the associated subset of the user generated content and the associated subset of the plurality of key events includes computer code for generating the search index associated with the segment of the content stream by:

identifying a plurality of terms associated with the segment that occur within the associated subset of the user generated content generated during the time the segment was shown, determining a term frequency score for each of the identified plurality of terms associated with the segment, determining one or more key terms for the segment of the content stream by determining frequency scores for one or more of the identified plurality of terms associated with the segment that are greater than frequency scores for the one or more of the identified plurality of terms associated with one or more other segments, and including the one or more key terms in the search index associated with the segment.

* * * * *